(12) United States Patent
Partridge

(10) Patent No.: US 8,308,132 B2
(45) Date of Patent: Nov. 13, 2012

(54) HEMI-WEDGE VERIFIABLE SHUTOFF VALVE

(75) Inventor: Charles C. Partridge, Houston, TX (US)

(73) Assignee: Chromatic Industries, Inc., Conroe, TX (US)

( * ) Notice: Subject to any disclaimer, the term of this patent is extended or adjusted under 35 U.S.C. 154(b) by 663 days.

(21) Appl. No.: 12/478,496

(22) Filed: Jun. 4, 2009

(65) Prior Publication Data

US 2010/0308247 A1    Dec. 9, 2010

(51) Int. Cl.
*F16K 5/06* (2006.01)
(52) U.S. Cl. .............. 251/315.16; 251/315.07; 251/304; 251/298; 251/159
(58) Field of Classification Search ............. 251/315.16, 251/315.07, 159, 172, 174, 298, 304
See application file for complete search history.

(56) References Cited

U.S. PATENT DOCUMENTS

| 4,962,911 | A | 10/1990 | Soderberg | |
|---|---|---|---|---|
| 5,145,150 | A * | 9/1992 | Brooks | ................. 251/188 |
| 5,333,834 | A | 8/1994 | Soderberg | |
| 5,360,036 | A | 11/1994 | Kieper | |
| 6,648,001 | B2 | 11/2003 | Chatufale | |
| 7,357,145 | B2 | 4/2008 | Soderberg | |
| 7,484,523 | B2 | 2/2009 | Church | |
| 7,836,909 | B2 * | 11/2010 | Church | ................. 137/15.22 |
| 2008/0179558 | A1 | 7/2008 | Lloyd | |

OTHER PUBLICATIONS

Notification concerning transmittal of International Preliminary Report on Patentability, Dec. 15, 2011, pp. 1-6.

* cited by examiner

*Primary Examiner* — Dinh Q Nguyen
(74) *Attorney, Agent, or Firm* — John J. Love; Claude E. Cooke, Jr.; Cooke Law Firm

(57) ABSTRACT

An improved hemi-wedge type valve is disclosed that has upstream and downstream sealing surfaces that cooperate with opposed surfaces on the hemi-wedge valve member. This results in improved sealing and less leakage, at both high and low pressures.

8 Claims, 4 Drawing Sheets

SIDE VIEW

TOP VIEW

UPSTREAM SEAT

DOWNSTREAM SEAT

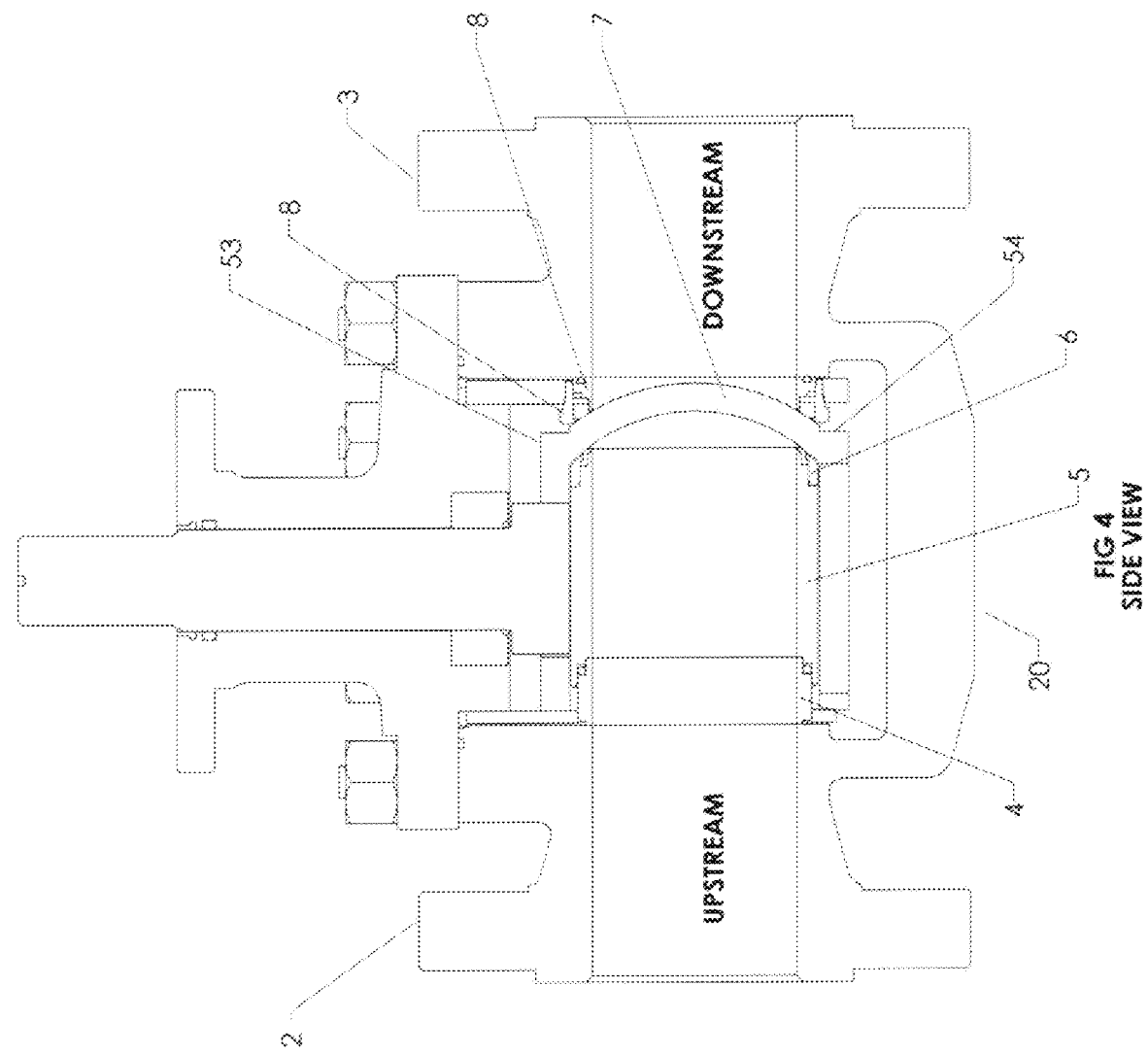

HEMI-WEDGE VERIFIABLE SHUTOFF VALVE

BACKGROUND OF INVENTION

1. Field of the Invention

The present invention generally relates to an improved valve for use in the control of fluids in a pipeline. The valve of the present invention is particularly useful in providing a means of verifying that valve is shutting off fluids at both high and low pressures.

2. Description of Related Art

Ball valves, plug valves, and the like are well known to those skilled in the art. A common characteristic of these valves is that they may be moved from a full open position to a full closed position through an angle of not more than about ninety (90) degrees.

A simple ball valve comprises a rotatable ball having a bore therethrough corresponding to the fluid flow path, together with a seat for sealing with the ball surface. Ball valves permit fluid flow to be fully stopped by rotating the ball not more than about ninety (90) degrees. However, these valves offer only minimal graduated control of the fluid flow achieved by setting the ball at intermediate positions. Further, these valves are placed in the open or closed position without a mechanical force applied by the closure member against a seat.

A simple plug valve comprises a rotatable tapered plug having a bore therethrough disposed in a complementary housing. The plug permits flow to be fully stopped by rotating the plug more than about ninety (90) degrees. Plug valves operate similarly to the previously described ball valve and offer similar advantages and disadvantages.

Gate valves, globe valves and the like are also well known to those skilled in the art. A common characteristic of the valves is that they may be moved from a full open position to a full closed position by the rising and lowering of a valve stem acting on a closure member (gate in a gate valve or disc or plug in a globe valve). These valves offer sealing advantages over ball valves, but take longer to open or close and generally have a higher leakage of fluid to the atmosphere with the rising and lowering of the stem.

Ball, plug and gate valves all can include a feature or variation of design commonly called "double-block-and-bleed". These valves have two seating surfaces which, in the closed position, block flow from both valve ends when the cavity between the seating surfaces is vented through a bleed connection provided on the body cavity. The seal between the seat and closure member occurs either at the exterior of a round surface or a flat surface, depending on valve type. The venting through a bleed connection provided on the body cavity permits verification that the valve is sealing or that the valve has leakage across one or more of the seating surfaces.

Another variation of design is called "double isolation block", and is similar to a "double-block-and-bleed". A double isolation block valve is a valve in which the body cavity is opened and the pressure is applied successively to each valve end and also to both the cavity and each end to demonstrate that no leakage is occurring in either the upstream seat or the downstream seat with pressure applied from either direction.

A valve offering significant advantages over conventional ball, plug, gate, and globe valves is the HEMIWEDGE® valve described in U.S. Pat. No. 4,962,911, and improved with a valve driver in U.S. Pat. No. 5,333,834, and improved with a cartridge feature for quick and easy repair in U.S. Pat. No. 7,357,145, the contents of which is incorporated by reference herein, and improved by method of manufacture in U.S. Pat. No. 7,484,523. The hemi-wedge valve includes a curved wedge comprising a tapered, spherical section rotatable through the fluid path and cooperating with a complementary curved seat to affect a shutoff. An important feature of the hemi-wedge valve is that the thickness of the wedge increases from its leading end to its trailing end when the valve is being closed. The wedge includes a bore forming a part of the fluid path through its thinner, leading end. The wedge is solid and thicker at its trailing end. Rotation of the hemi-wedge through about ninety (90) degrees into the fluid path closes the fluid path by blocking it with the solid and thicker end of the wedge. This provides a mechanical loading of the seat. Another important feature of the hemi-wedge valve is a replaceable cartridge which may be quickly and easily removed and replaced in a valve body without removing the valve from the pipeline.

BRIEF DESCRIPTION OF THE SEVERAL VIEWS OF THE DRAWING(S)

FIG. 4 is a longitudinal cross section of the valve body.

BRIEF SUMMARY OF THE INVENTION

This invention relates to improvements in shut off valves of the hemi-wedge type. Valve seats are provided on the upstream and downstream portions of the hemi-wedge for improved sealing. Also, a three piece valve core body in conjunction with flexible seals and the two valve seats allows for a tight seal at both high and low pressures. A vent port is also provided in the body to allow for verification that there is no leaking occurring on either side of the valve member. The upstream seat design allows upstream pressure to assist in a tight shutoff and likewise the downstream seat allows a downstream pressure to assist in a tight shutoff.

DETAILED DESCRIPTION OF THE INVENTION

Figure 1:
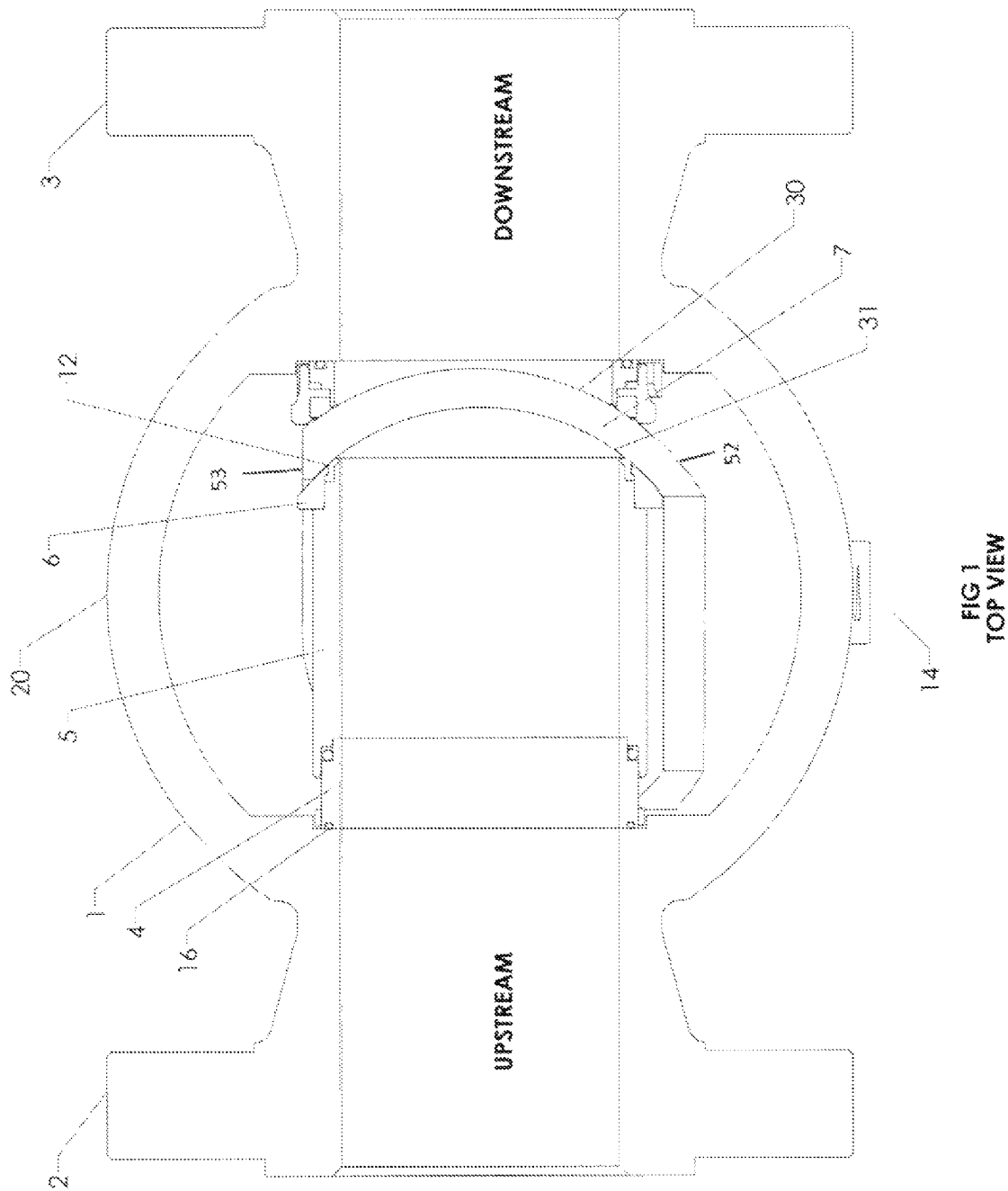
FIG. 1 is a top cross-sectional view of the valve according to the invention.

As shown in FIG. 1, shutoff valve 1 includes a housing having an inlet section 2, middle section 20, and outlet section 3 which includes an upstream portion 51. A three piece valve core assembly 4, 5 and 6 is located within middle section 20. First valve core member 4 is a cylindrical member with an internal bore for fluid flow.

Figure 2:
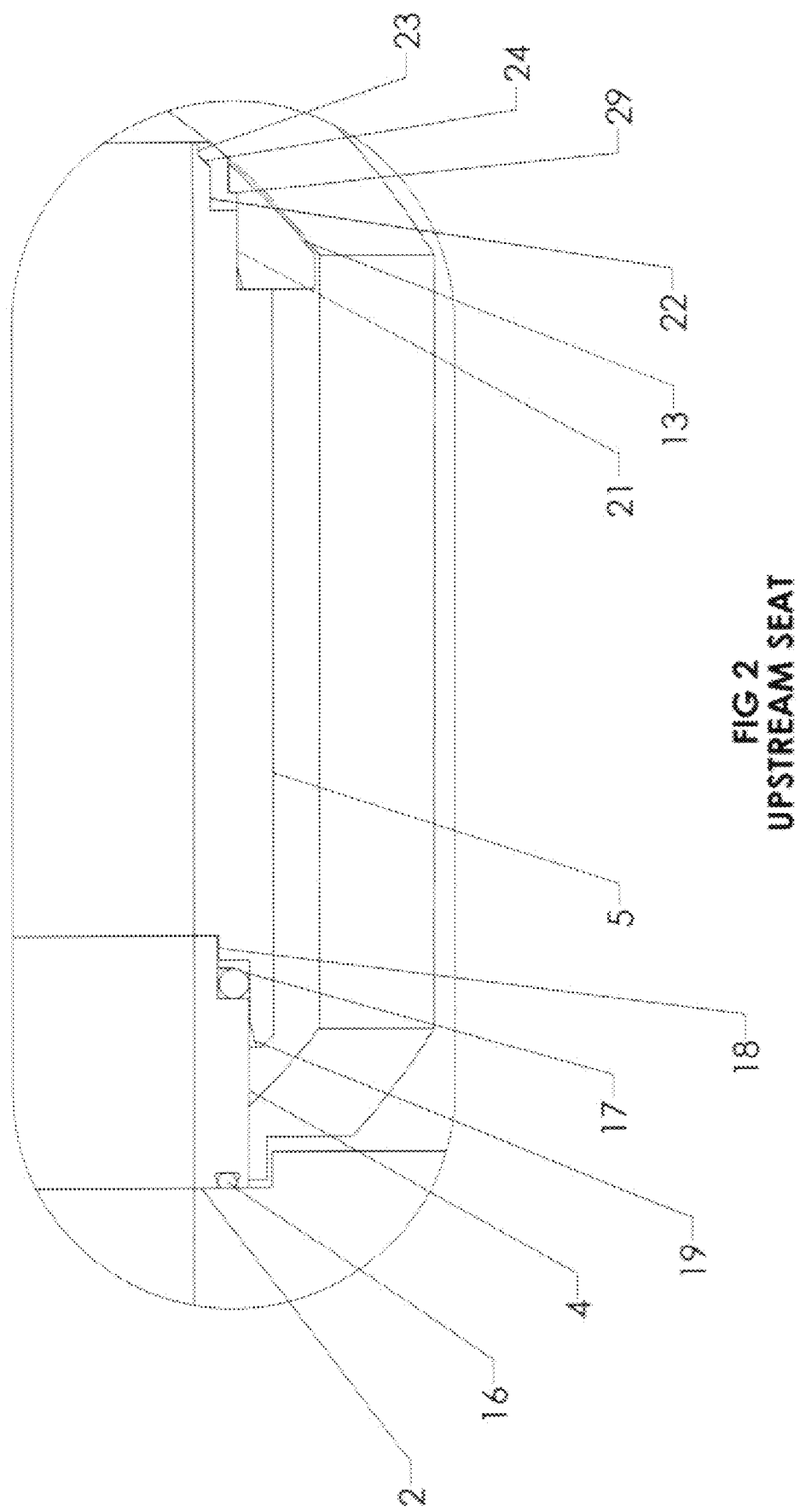
FIG. 2 is a sectional view of the three piece valve core assembly including a first sealing surface.

A seal 16 is located at the upstream end face portion of valve core member 4 that is in sealing contact with an internal shoulder formed in inlet housing 2 as shown in FIG. 2. The outer surface of valve core member 4 includes a reduced outer diameter portion at its downstream area to accommodate seal 17. Second core valve member 5 is also cylindrical with an internal bore corresponding to that of first core member 4. As shown in FIG. 2, the upstream portion of second core member 5 has two stepped portions 18 and 19. Step portion 18 receives the reduced diameter portion of first core member 4 and second step 19 receives the outer surface of first core member 4 thereby forming a chamber that confines seal 17 as shown in FIG. 2. This arrangement allows relative axially movement of core members 4 and 5. The downstream end of second core member 5 has first, second, and third steps 21, 22, and 23 respectively as shown in FIG. 2. There is also provided a beveled portion 24 between steps 22 and 23. The third valve core member 6 acts as a sealing member in cooperation with the concave upstream portion of hemi-wedge 7. Third core member 6 has a first interior annular section that rests on step 21 of second core member 5. The downstream end face 13 of third core member 6 is closely machined so as to form a first sealing surface with the upstream surface 31 of hemi-wedge 7. An internal step 29 is provided within third valve core member 6 at its downstream portion. Steps 21, 22 and 23, bevel 24 and step 29 cooperate to form a cavity that receives a complimentary sealing ring 12, which may be made of nylon, which also cooperates with upstream surface 31 of the hemi-wedge 7 to form a seal.

Figure 3:
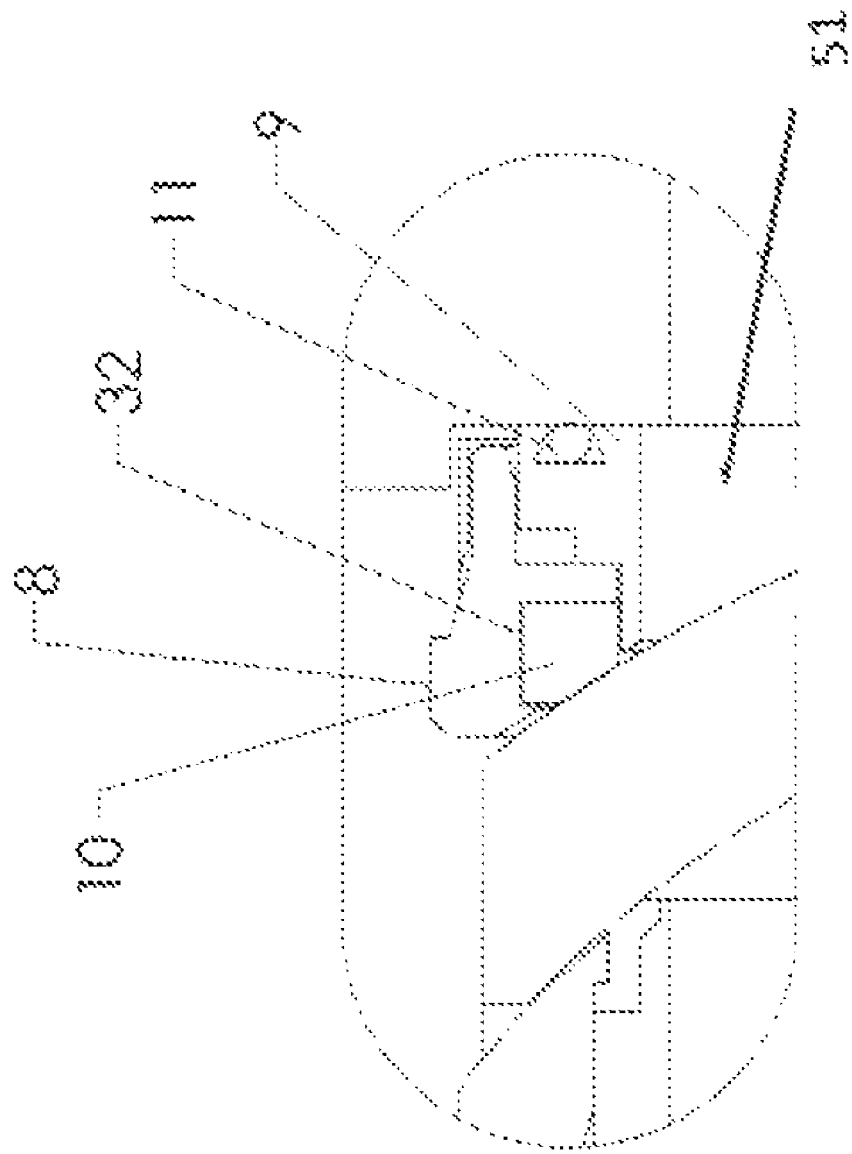
FIG. 3 is a sectional view of the downstream seal mechanism.

As shown in FIG. 3, the downstream portion of the valve includes a first annular valve seat member 8 with groove 32 that receives resilient member 10. A second annular member 9 which includes seal 11 is positioned between the upstream face of outlet portion 3 and annular member 8 as is known in the prior art. The thickness of hemi-wedge 7 from the upstream surface 31 to downstream surface 30 increases from its leading edge 52 to its trailing training edge 53. The upper and lower portions of the hemi-wedge may be provided with to cooperate with recesses in the middle portion 20 of the valve housing to rotatably support the hemi-wedge within the valve body. A valve body vent 14 is provided in the middle portion 20 of the valve body.

In the closed position, the hemi-wedge seals and blocks flow and pressure from both ends of the valve. The upstream and downstream seats also shutoff fluids from entering the body cavity on the outside of the upstream seat. The body cavity can be vented through a port installed in the valve body to demonstrate that leakage does not occur across the seals in the upstream or downstream seats. Alternatively stated, the body cavity can be vented through a port installed in the valve body to check for a tight seal or shutoff with pressure applied from the upstream direction or the downstream direction or pressure from both directions. The upstream seat design also allows upstream pressure to assist in a tight shutoff. And likewise, the downstream seat allows a downstream pressure to assist in a tight shutoff. Due to the mechanical wedging action of the hemi-wedge which loads the seats as it moves from fully open to fully closed, the seats are independent of each other and do not rely on upstream pressure or downstream pressure only for sealing. This term may be referred to as a verifiable shutoff feature.

In the present invention, the one-piece hemi-wedge is supported at the top with a trunnion 53 and can be supported at the bottom with a trunnion 54 as either part of the valve body or an insert into the body, as shown in FIG. 4. This trunnion support with complementary multiple offsets in the machine radius of the inside (concave) curved surface and the centerpoint of the machine radius of the outside (convex) curved surface can center the hemi- with either or both the upstream and downstream seats to provide a mechanical seal as the hemi- travels from fully open to fully closed. This unique attribute also allows the design to be used with elastomeric, plastic or metal seats, allows bi-directional shutoff, and allows for use of a multi-piece core for a verifiable (double block-and-bleed) shutoff. It also allows the design to be used as a double isolation block valve with both seats bi-directional. A double isolation block valve is a valve in which the body cavity is opened and the pressure is applied from successively to each valve end and also to both the cavity and each end to demonstrate that no leakage is occurring in either the upstream seat or the downstream seat with pressure applied from either direction. The addition of the support at the bottom with a hemi-wedge trunnion provides the ability to reduce loading due to the differential pressure applied to a hemi-wedge in the closed position, which results in lower force to rotate the stem, which permits the valve to be used in higher pressures than can be achieved with the aforementioned floating design.

Further, in the present invention, the closure member may be a single component combining the rotatable valve member as described in U.S. Pat. No. 4,962,911 and the valve driver as described in U.S. Pat. No. 5,333,834. This component will thenceforth be called a one-piece hemi-wedge in this present invention. The one-piece hemi-wedge serves the same function as a combination of hemi-wedge and valve driver as described in aforementioned art, and is a functional improvement in the standard hemi-wedge valve due to the reduction of components subject to wear or mechanical failure and the manufacturing improvement due to the set up of machining of only one component, elimination of fasteners, and simplicity of assembly of the cartridge as described in U.S. Pat. No. 7,357,145. One significant contribution of the one-piece hemi-wedge to the novelty of the present invention is the internal curved surface (concave side) may be machined for sealing against the one end on the multi-piece core to provide an upstream seat. This unique attribute combined with previous art provides the ability to provide both an upstream and a downstream seat with a hemi-spherical wedge closure member. This unique attribute combined with previous art also provides the ability for the hemi-spherical wedge closure member to provide a tight seal at both high and low pressures.

Further, in the present invention, the one-piece hemi-wedge may be allowed to move (commonly referred to as floating) at the bottom so that an offset in the centerpoint of the machine radius of the inside (concave) curved surface and the centerpoint of the machine radius of the outside (convex) curved surface can center the hemi-wedge with either or both the upstream and downstream seats to provide a mechanical seal as the hemi-wedge travels from fully open to fully closed. This unique attribute also allows the design to be used with elastomeric, plastic or metal seats, allows bi-directional shutoff, and allows for use of a multi-piece core for a verifiable (double block-and-bleed) shutoff.

Further, in the present invention, the multi-piece core consists of elongated middle member 5, an upstream member 4 that seals against the body, a downstream member 6 that seals against the hemi-wedge, and either or both elastomers or springs between the seat ring components to provide loading and seals. This multi-piece core using elastomers or springs is also referred to as an expandable core. The downstream portion of valve core member 6 may be metal with a smooth finish for metal-to-metal sealing or it may have an insert with various plastic or elastomeric materials to provide a resilient seat. The expandable core provides a constant contact against the hemi-wedge as the hemi-wedge rotates from open to close or close to open. Likewise, the downstream seat provides similar loading on the hemi-wedge. In the closed position, the solid, thicker portion of the hemi-wedge loads both the upstream and downstream seats to provide a tight shutoff. In the closed position, the seats block flow from both valve ends and the cavity in the body between the seating surfaces is vented through a bleed connection provided on the body cavity. This venting can demonstrate both a double-block-and-bleed and a bi-directional double isolation block valve.

Further, in the present invention, the arrangement of the one-piece hemi-wedge and an expandable core with a body vent provides a bi-directional sealing at both low and high pressures and the ability to vent the body cavity to check for shutoff (tight seal) with pressure applied from the upstream direction or the downstream direction or pressure from both directions. The upstream seat design also allows upstream pressure to assist in a tight shutoff. And likewise, the downstream seat allows a downstream pressure to assist in a tight shutoff. However, due to the mechanical wedging action of the hemi-wedge, which loads the seats as it moves from fully open to fully closed, the seats are independent of each other and do not rely on upstream pressure or downstream pressure only for sealing. This unique arrangement will also relieve pressure buildup due to thermal expansion to the higher pressure side of the valve.

Although the present invention has been described with respect to specific details, it is not intended that such details should be regarded as limitations on the scope of the invention, except to the extent that they are included in the accompanying claims.

I claim:

1. A valve comprising:
    a housing having a fluid inlet and a fluid outlet;
    a flow path connecting the fluid inlet to the fluid outlet;
    a rotatable hemi-wedge valve closure member mounted within the housing;
    a valve body core defining of a portion of a flow path;
    a downstream portion of the valve body core having a first sealing surface;
    an upstream portion of the outlet including a valve seat member; and
    the hemi-wedge rotatable between an open position allowing for unobstructed flow of fluid through the valve and a closed position in which an upstream surface of the hemi-wedge engages the first sealing surface and a downstream surface of the hemi-wedge engages the valve seat member,
    wherein the valve body core includes a first valve core member and a second valve core member and a resilient seal between the first and second core members which allows the first and second valve core members to move longitudinally with respect to each other.

2. A valve according the claim 1 wherein the housing has a vent.

3. A valve according to claim 1 wherein the hemi-wedge thickness increases from a leading edge to a trailing edge.

4. The valve according to claim 1 wherein the first sealing surface includes a machined metal contact surface and a resilient portion.

5. The valve according to claim 1 wherein the first valve core member has a seal on its upstream face that engages a sealing surface in a downstream portion of the fluid inlet.

6. A valve according to claim 1 wherein the valve seat member includes a first annular valve seat member carrying a resilient member and a second annular member carrying a seal that engages a shoulder formed in an upstream portion of the fluid outlet.

7. A valve according to claim 1 wherein a downstream portion of the second core valve member includes first, second, and third-steps; and a third valve core member including an internal step at its downstream end which cooperates with the first, second and third steps of the second core valve member core portion to receive a sealing ring.

8. A valve according to claim 4 wherein the resilient portion of the first sealing surface is a nylon sealing ring.

* * * * *